US011562603B2

(12) United States Patent
Tammali et al.

(10) Patent No.: US 11,562,603 B2
(45) Date of Patent: Jan. 24, 2023

(54) COLLISION ANALYSIS PLATFORM USING MACHINE LEARNING TO REDUCE GENERATION OF FALSE COLLISION OUTPUTS

(71) Applicant: Allstate Insurance Company, Northbrook, IL (US)

(72) Inventors: Venu Madhav Tammali, Chicago, IL (US); Kyle Patrick Schmitt, Chicago, IL (US); Jeremy Deram, Northbrook, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 393 days.

(21) Appl. No.: 16/912,826

(22) Filed: Jun. 26, 2020

(65) Prior Publication Data

US 2021/0407219 A1    Dec. 30, 2021

(51) Int. Cl.
*G06F 7/00*  (2006.01)
*G07C 5/00*  (2006.01)
(Continued)

(52) U.S. Cl.
CPC .............. *G07C 5/008* (2013.01); *B60R 21/00* (2013.01); *G06N 20/00* (2019.01); *G08G 1/202* (2013.01); *B60R 2021/0027* (2013.01)

(58) Field of Classification Search
CPC ........ G07C 5/008; G06N 20/00; B60R 21/00; B60R 2021/0027; G08G 1/202
(Continued)

(56) References Cited

U.S. PATENT DOCUMENTS 7,082,359 B2    7/2006  Breed
9,183,593 B2   11/2015  Willis et al.
(Continued)

FOREIGN PATENT DOCUMENTS

WO    2018144917 A1    8/2018

OTHER PUBLICATIONS

Venu Tammali & Shanshan Wang "Mobility data and analytics: how Arity creates its algorithms" Arity https://www.arity.com/move/arity-fine-tune-invaluable-algorithms/ Feb. 8, 2019, pp. 1-2.
(Continued)

*Primary Examiner* — Kerri L McNally
*Assistant Examiner* — Thang D Tran
(74) *Attorney, Agent, or Firm* — Polsinelli PC

(57) ABSTRACT

Aspects of the disclosure relate to computing platforms that utilize machine learning to reduce false positive/negative collision output generation. A computing platform may apply machine learning algorithms on received data to generate a collision output. In response to generating the collision output indicating a collision, the computing platform may identify a data collection location. If the data collection location is within a predetermined radius of a false positive collection location, the computing platform may modify the collision output to indicate a non-collision. If the data collection location is not within the predetermined radius, the computing platform may compute a score using telematics data and compare the score to a predetermined threshold. If the score does not exceed the predetermined threshold, the computing platform may modify the collision output to indicate a non-collision. If the score exceeds the predetermined threshold, the computing platform may affirm the collision output indicating a collision.

20 Claims, 14 Drawing Sheets

(51) Int. Cl.
*B60R 21/00* (2006.01)
*G06N 20/00* (2019.01)
*G08G 1/00* (2006.01)

(58) Field of Classification Search
USPC .................................................. 701/32.2
See application file for complete search history.

(56) References Cited

U.S. PATENT DOCUMENTS

| | | | |
|---|---|---|---|
| 9,392,431 B2 * | 7/2016 | Barfield, Jr. | G07C 5/008 |
| 9,449,495 B1 * | 9/2016 | Call | H04W 4/029 |
| 9,491,420 B2 | 11/2016 | Mimar | |
| 9,558,520 B2 | 1/2017 | Peak et al. | |
| 9,638,711 B2 | 5/2017 | Barfield et al. | |
| 10,019,904 B1 | 7/2018 | Chan | |
| 10,083,551 B1 * | 9/2018 | Schmitt | G07C 5/085 |
| 10,176,524 B1 * | 1/2019 | Brandmaier | G08G 1/0112 |
| 10,232,847 B2 | 3/2019 | Cordova et al. | |
| 10,246,037 B1 * | 4/2019 | Shea | B60R 21/0132 |
| 10,417,816 B2 | 9/2019 | Satzoda et al. | |
| 10,559,196 B2 | 2/2020 | Matus et al. | |
| 10,573,184 B1 * | 2/2020 | Pandit | G08G 1/207 |
| 10,582,354 B1 | 3/2020 | Isaac et al. | |
| 10,604,097 B1 | 3/2020 | Jacob et al. | |
| 10,869,180 B1 * | 12/2020 | Moriarty | G08B 25/016 |
| 11,138,814 B1 * | 10/2021 | Sanchez | G07C 5/006 |
| 2015/0084757 A1 * | 3/2015 | Annibale | H04W 4/38 340/436 |
| 2015/0088335 A1 * | 3/2015 | Lambert | G08G 1/20 701/1 |
| 2015/0189464 A1 * | 7/2015 | Chu | H04W 4/02 455/456.3 |
| 2015/0283968 A1 * | 10/2015 | Nakamura | B60R 21/00 340/436 |
| 2018/0189577 A1 * | 7/2018 | Yoo | G06T 7/593 |
| 2019/0049256 A1 * | 2/2019 | Camp | B60W 40/068 |
| 2019/0244301 A1 * | 8/2019 | Seth | G06F 16/73 |
| 2019/0349462 A1 * | 11/2019 | Cordova | B60K 28/14 |
| 2020/0115863 A1 * | 4/2020 | Kozloski | G08G 1/0133 |
| 2021/0312811 A1 * | 10/2021 | Ohlarik | G06N 20/00 |
| 2021/0342946 A1 * | 11/2021 | Leise | G06Q 20/4015 |
| 2022/0244736 A1 * | 8/2022 | Konrardy | G05D 1/0088 |

OTHER PUBLICATIONS

Dang-Nhac Lu et al. "Vehicle Mode and Driving Activity Detection Based on Analyzing Sensor Data of Smartphones" US National Library of Medicine National Institutes of Health https://www.ncbi.nlm.nih.gov/pmc/articles/PMC5948751/ Mar. 29, 2018, pp. 1-25.
Syedul Amin et al. "Integrated Vehicle Accident Detection and Location System" ResearchGate https://www.researchgate.net/publication/286508977_Integrated_Vehicle_Accident_Detection_and_Location_System Mar. 2014, pp. 1-7.

* cited by examiner

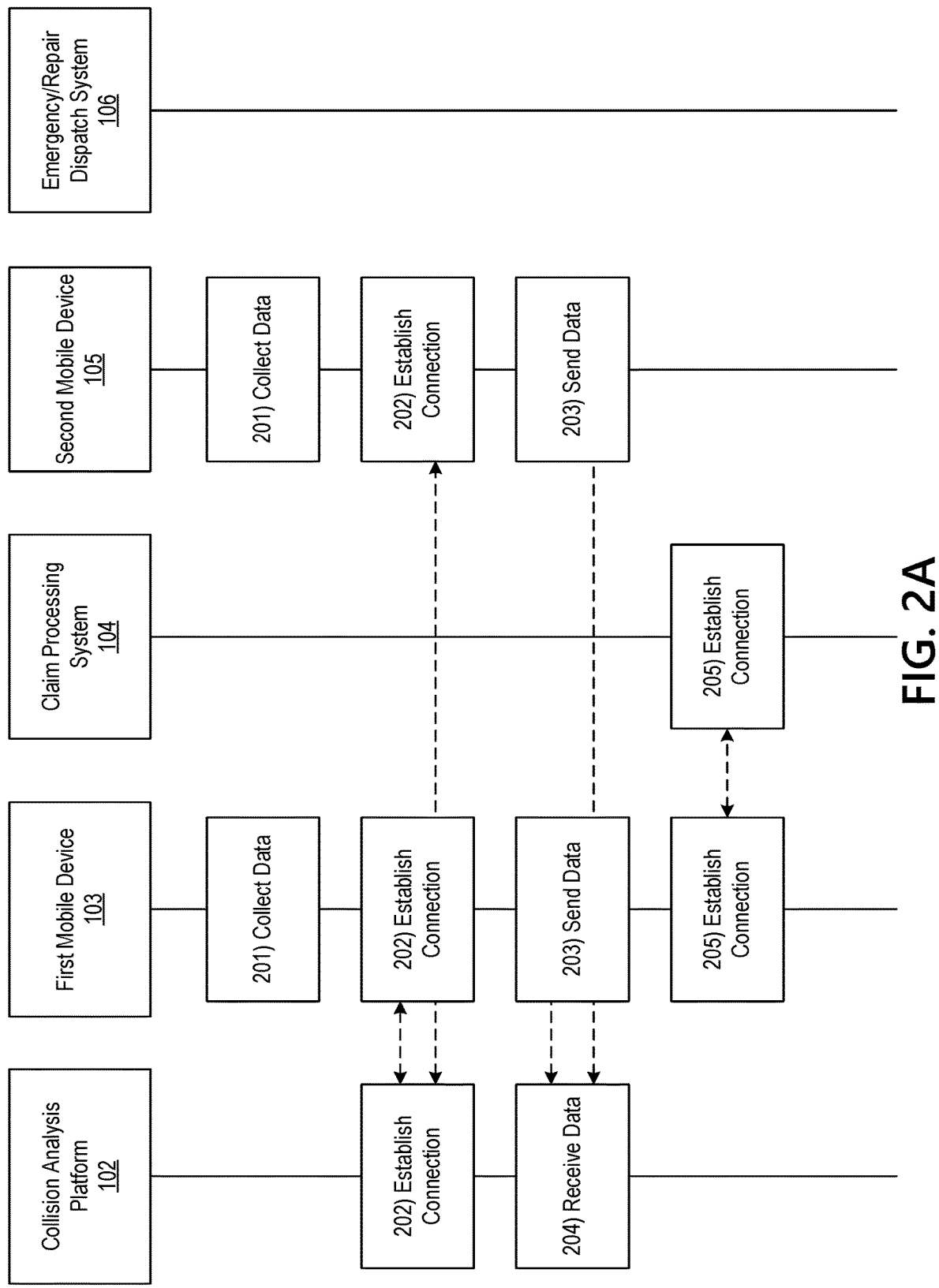

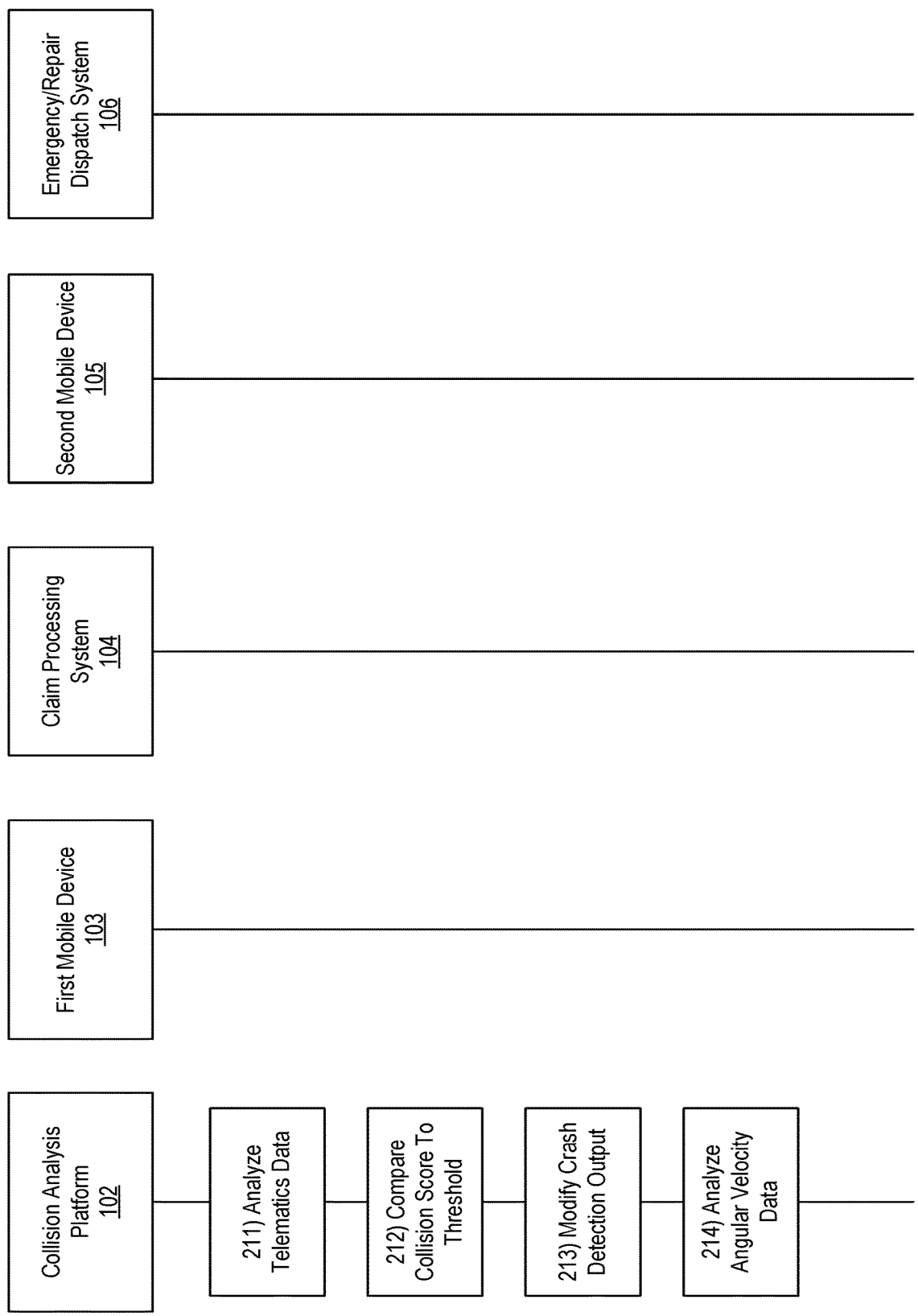

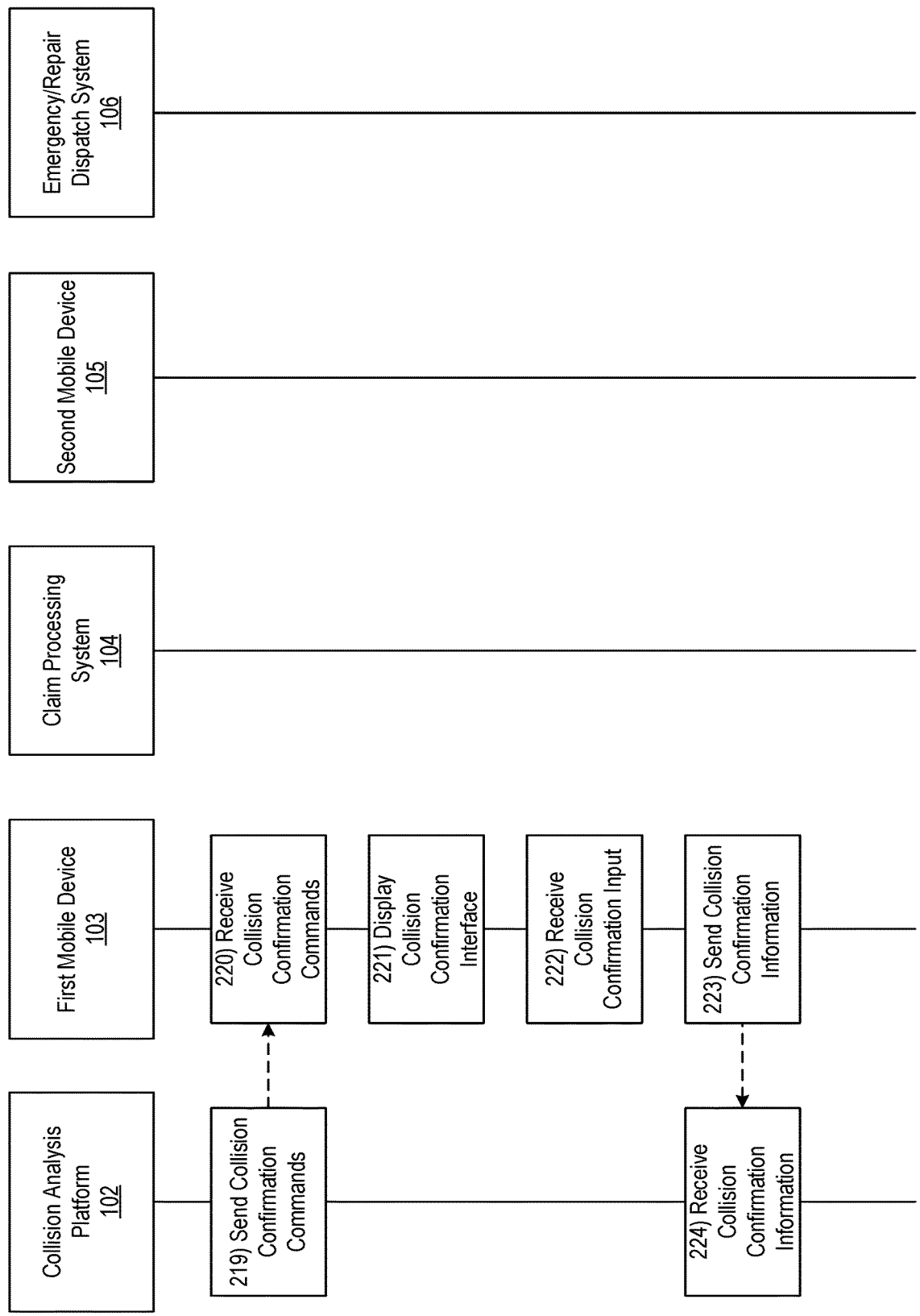

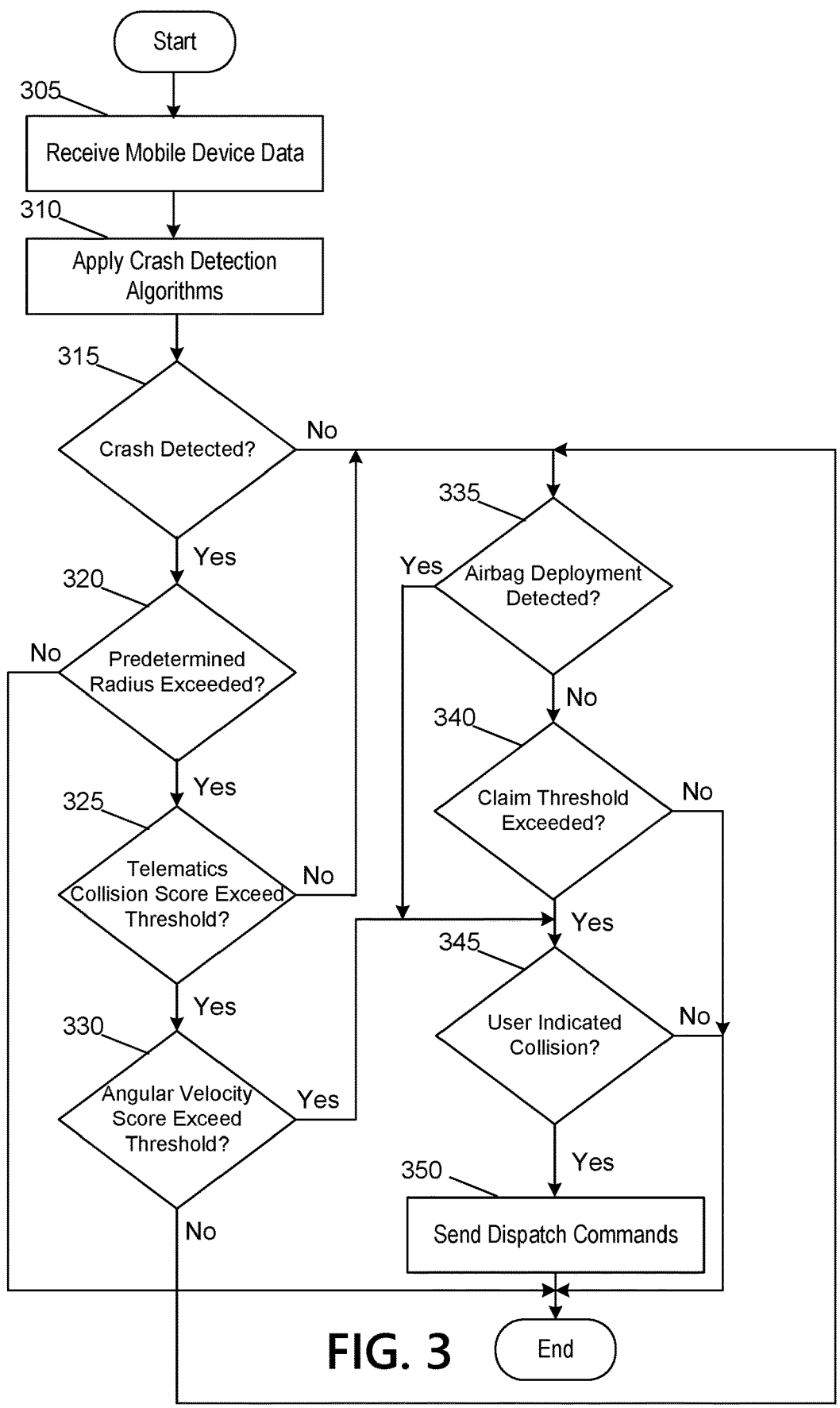

405

Claim Initiation Interface

Please enter the details of your claim below:

I experienced a head on collision in my vehicle at 3PM on April 24, 2020, at the intersection of "Street #1" and "Street #2."

Collision Confirmation Interface

We detected that you experienced a collision. Were we correct?

Yes   No

FIG. 5

COLLISION ANALYSIS PLATFORM USING MACHINE LEARNING TO REDUCE GENERATION OF FALSE COLLISION OUTPUTS

BACKGROUND

Aspects of the disclosure relate to enhanced processing systems for executing machine learning algorithms and automatically determining whether or not a collision occurred. Many organizations and individuals use sensor data to determine whether or not a collision occurred. In many instances, however, these determinations may result in false positive and/or false negative results. In addition to the inaccuracies caused by such results, unnecessary resources may be expended or deployed in response to a false positive determination. Similarly, resources may be wrongfully conserved or withheld in response to a false negative determination.

SUMMARY

Aspects of the disclosure provide effective, efficient, scalable, and convenient technical solutions that address and overcome the technical problems associated with real time on the edge automated collision determinations. In accordance with one or more arrangements discussed herein, a computing platform having at least one processor, a communication interface, and memory may receive sensor data. By applying one or more machine learning algorithms to the sensor data, the computing platform may generate an event and an associated confidence of whether or not the event is a collision event. In addition to generating the event and a confidence of whether a collision occurred, the computing platform may: 1) identify the location where the event is triggered, and 2) determine whether or not the location is within a predetermined radius of a false positive collection location. In response to determining that the data collection location is within the predetermined radius, the computing platform may modify the event confidence to indicate that a collision did not occur. In response to determining that the data collection location is not within the predetermined radius, the computing platform may: 1) analyze telematics data included in the sensor data to modulate the confidence of collision score, and 2) compare confidence of collision score to a predetermined collision threshold. In response to determining that the confidence of collision score does not exceed the predetermined collision threshold; the computing platform may modify the collision output to indicate that a collision did not occur.

In response to determining that the confidence of collision score exceeds the predetermined collision threshold, in one or more instances, the computing platform may analyze angular velocity data included in the sensor data, by comparing the angular velocity data to one or more machine learning datasets corresponding to non-collision events in which a mobile device was dropped, to further modulate confidence of the collision score. The computing platform may compare the confidence of collision score to the predetermined collision threshold. In response to determining that the confidence of collision score does not exceed the predetermined collision threshold; the computing platform may modify the collision output to indicate that a collision did not occur. In response to determining that the confidence of collision score exceeds the predetermined collision threshold, in one or more instances, the computing platform may compute a time difference between trip start time and event time. In response to determining that the time difference is below a predetermined time threshold; the computing platform may modify the collision output to indicate that a collision did not occur.

In one or more examples, the sensor data may be received from one or more of: a mobile device or vehicle based sensors. In one or more instances, the computing platform may analyze one or more of: a data collection location, telematics data, or angular velocity corresponding to a second mobile device to generate a second collision output, where the sensor data is provided to the computing platform, at least in part, by the second mobile device. The computing platform may determine whether the second collision output indicates that a collision did occur. In response to determining that the second collision output indicates that a collision did not occur, the computing platform may modify the collision output to indicate that a collision did not occur. In response to determining that the second collision output indicates that a collision did occur, the computing platform may affirm the collision output indicating that a collision did occur.

In one or more examples, the computing platform may send a corroboration request to a mobile device corresponding to the sensor data. The computing platform may receive, from the mobile device, crash confirmation information indicating whether or not a collision occurred, which may be based on user input received at the mobile device indicating whether or not the collision occurred. In response to determining that the crash confirmation information indicates that the collision did not occur, the computing platform may modify the collision output to indicate that a collision did not occur. In response to determining that the crash confirmation information indicates that the collision did occur, the computing platform may affirm the collision output indicating that a collision did occur.

In one or more instances, in response to generating the collision output indicating that a collision did not occur, the computing platform may compare barometric data included in the sensor data to a predetermined airbag deployment threshold. In response to determining that the barometric data exceeds the predetermined airbag deployment threshold, the computing platform may modify the collision output to indicate that a collision did occur. In one or more examples, in response to not generating a collision output indicating that a collision did not occur, the computing platform may: 1) compare one or more thresholds determined using the telematics data with the predetermined collision threshold, wherein the predetermined collision threshold is derived, using Machine Learning, from the dataset formed by merging historical telematics data and historical claims data; 2) in response to determining that the one or more thresholds are greater than the predetermined collision threshold, modify the collision output to indicate that a collision occurred; and 3) in response to determining that the one or more thresholds are lower than the predetermined collision threshold, affirm the collision output indicating that a collision did not occur.

In one or more instances, the false positive collection location may be one or more of: a ski resort, an amusement park, or a body of water. In one or more examples, the computing platform may analyze the telematics data included to modulate the confidence of collision score by comparing the telematics data to one or more machine learning datasets corresponding to a roller coast event, a ski event, or a boat event.

In one or more instances, the computing platform may update, after modifying the collision output, the one or more machine learning algorithms to indicate that a false positive collision determination was made by the one or more machine learning algorithms.

In accordance with one or more alternative arrangements discussed herein, a computing platform having at least one processor, a communication interface, and memory may receive sensor data. By applying one or more machine learning algorithms to the sensor data, the computing platform may generate a collision output indicating whether or not a collision occurred. In response to generating the collision output indicating that a collision occurred, the computing platform may 1) analyze telematics data included in the sensor data to compute a first likelihood of collision score, and 2) compare the first likelihood of collision score to a predetermined collision threshold. In response to determining that the first likelihood of collision score does not exceed the predetermined collision threshold, the computing platform may modify the collision output to indicate that a collision did not occur. In response to determining that the first likelihood of collision score exceeds the predetermined collision threshold, the computing platform may 1) identify a data collection location corresponding to the sensor data, and 2) determine whether or not the data collection location is within a predetermined radius of a false positive collision location. In response to determining that the data collection location is within the predetermined radius, the computing platform may modify the collision output to indicate that a collision did not occur. In response to determining that the data collection location is not within the predetermined radius, the computing platform may affirm the collision output indicating that a collision did occur. Based on a determination that the collision output indicates that a collision did occur, the computing platform may send one or more commands to a dispatch computing system directing the dispatch computing system to dispatch a service vehicle to a location of the collision, which may cause the dispatch computing system to dispatch the service vehicle to the location of the collision.

In accordance with one or more alternative arrangements discussed herein, a computing platform having at least one processor, a communication interface, and memory may receive sensor data. By applying one or more machine learning algorithms to the sensor data, the computing platform may generate a collision output indicating whether or not a collision occurred. In response to generating the collision output indicating that a collision occurred, the computing platform may apply one or more of: a geo-location filter or a telematics filter to the collision output. For example, the computing may apply the geo-location filter by: 1) identifying a data collection location corresponding to the sensor data, 2) determining whether or not the data collection location is within a predetermined radius of a false positive collection location, 3) in response to determining that the data collection location is within the predetermined radius, modifying the collision output to indicate that a collision did not occur, and 4) in response to determining that the data collection location is not within the predetermined radius, affirming the collision output to indicate that a collision did occur. Additionally or alternatively, the computing platform may apply the telematics filter by: 1) analyzing telematics data included in the sensor data to compute a first likelihood of collision score, 2) comparing the first likelihood of collision score to a predetermined collision threshold, 3) in response to determining that the first likelihood of collision score does not exceed the predetermined collision threshold, modifying the collision output to indicate that a collision did not occur, and 4) in response to determining that the first likelihood of collision score exceeds the predetermined collision threshold, affirming the collision output indicating that a collision did occur. Based on a determination that the collision output indicates that a collision did occur, the computing platform may send one or more commands to a dispatch computing system directing the dispatch computing system to dispatch a service vehicle to a location of the collision, which may cause the dispatch computing system to dispatch the service vehicle to the location of the collision.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for implementing improved machine learning techniques to apply geospatial and telematics filters to reduce generation of false positive and false negative collision outputs in accordance with one or more example arrangements discussed herein;

FIG. 3 depicts an illustrative method for implementing improved machine learning techniques to apply geospatial and telematics filters to reduce generation of false positive and false negative collision outputs in accordance with one or more example arrangements discussed herein; and FIGS. 4-6 depict illustrative user interfaces for implementing improved machine learning techniques to apply geospatial and telematics filters to reduce generation of false positive and false negative collision outputs in accordance with one or more example arrangements discussed herein.

DETAILED DESCRIPTION

Figure 1A:
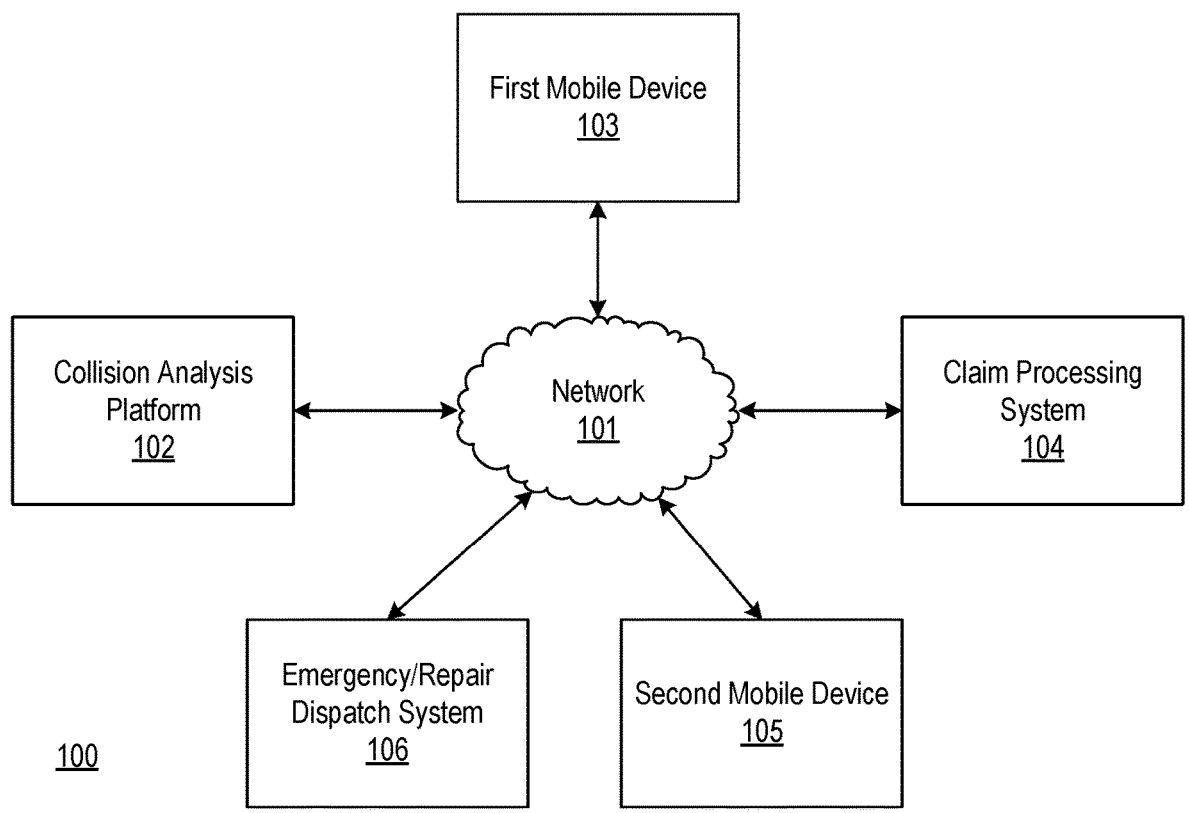
FIGS. 1A-1B depict an illustrative computing environment for implementing improved machine learning techniques to apply geospatial and telematics filters to reduce generation of false positive and false negative collision outputs in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the description herein provides systems and methods for leveraging machine learning techniques to reduce generation of false positive and false negative collision outputs. For example, several filters are described that may be applied after generation of a positive collision output (e.g., a determination that a collision occurred) to further confirm a determination that a collision did occur. Additionally, or alternatively, several methods are described that may be applied after generation of a negative collision output (e.g., a determination that a collision did not occur) to further confirm a determination that a collision did not occur.

With regard to reducing false positive determinations, in some instances, computing platforms may apply a geospatial filter to filter out movement activities, such as roller coaster rides, ski trips, or the like (based on a data collection location) that may contain data that may otherwise be falsely identified as a collision. Similarly, computing platforms may apply a telematics filter to filter out movement activities, such as roller coaster rides, ski trips, boat trips, or the like (e.g., using machine learning to compare received data to these types of data) to reduce false positive determinations. Additionally, or alternatively, computing platforms may analyze angular velocity data (e.g., using machine learning to distinguish between a collision and instances where a user merely dropped his or her phone).

With regard to reducing false negative determinations, in some instances, computing platforms may analyze barometric data to determine whether or not air bags were deployed (e.g., if so, a collision likely occurred). Additionally, or alternatively, computing platforms may analyze telematics data by comparing the data with a data set created by merging historical claims data with its associated telematics data. (e.g., if so, a collision likely occurred). Additionally, or alternatively, the computing platforms may corroborate a determination of whether or not a collision occurred using data received from another mobile device (e.g., if data from both devices suggests a collision, likely that one occurred).

In doing so, one or more of the systems and methods described herein may improve automated collision analysis. For example, by applying machine learning to analyze geo-location, telematics data, angular velocity data, barometric data, or the like, perform corroboration with other devices, and/or match collision data against submitted claims, these systems and methods may verify collision outputs generated through machine learning analysis to reduce both false negative and false positive determinations. Accordingly, automated collision analysis may be performed with greater accuracy.

Figure 1B:
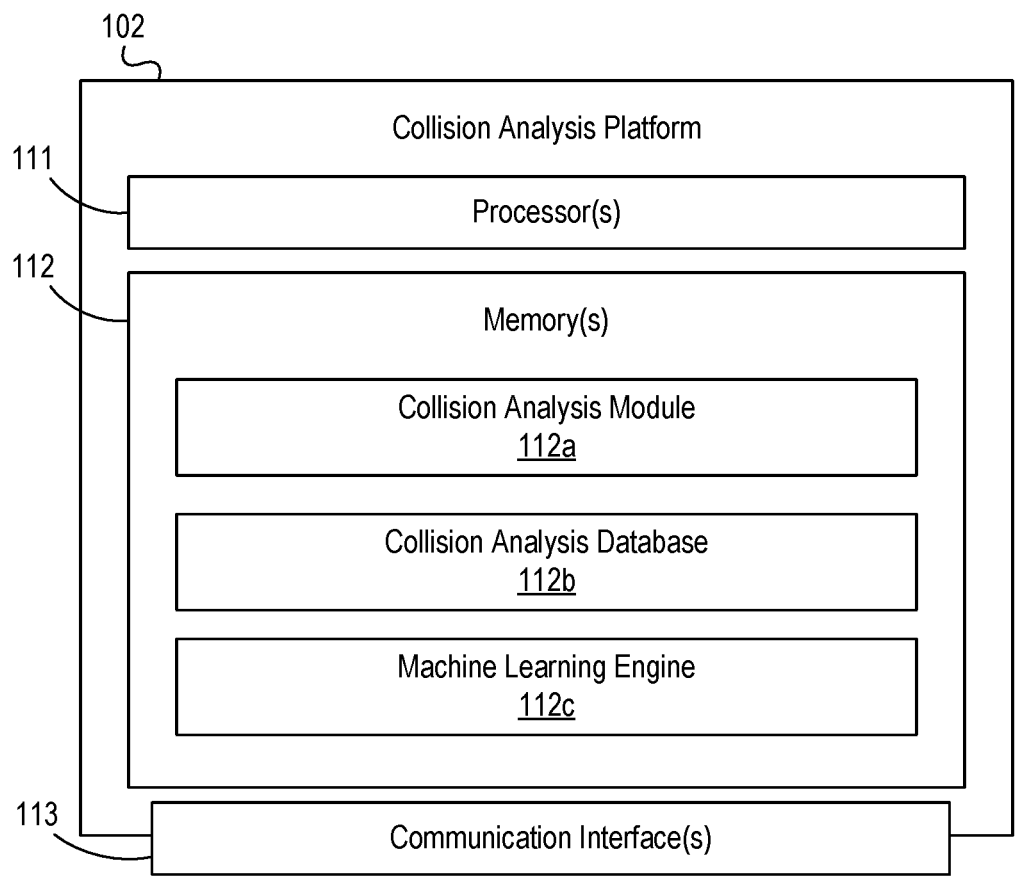

FIGS. 1A and 1B depict an illustrative computing environment for implementing improved machine learning techniques to apply geospatial and telematics filters to reduce generation of false positive and false negative collision outputs in accordance with one or more example embodiments. Referring to FIG. 1A, computing environment 100 may include one or more computer systems. For example, computing environment 100 may include collision analysis platform 102, first mobile device 103, claim processing system 104, second mobile device 105, and emergency/repair dispatch system 106.

As illustrated in greater detail below, collision analysis platform 102 may include one or more computing devices configured to perform one or more of the functions described herein. For example, collision analysis platform 102 may include one or more computer systems, servers, server blades, or the like. In one or more instances, collision analysis platform 102 may be configured to determine collision outputs based on received sensor data, and to confirm those collision outputs by applying one or more false positive and/or false negative filters (which may, in some instances, include machine learning analysis). In some instances, the collision analysis platform 102 may be configured to dynamically tune machine learning models and/or algorithms as additional data is detected and analyzed. In one or more examples, the collision analysis platform 102 may be integrated into a vehicle or mobile device or may be located at a remote location from the vehicle.

First mobile device 103 may be a computing device (e.g., a smart phone, a tablet, on board vehicle screen, laptop, or the like) that may be used by, for example, a driver/customer of an enterprise organization such as an insurance company. It should be understood that first mobile device 103 is not necessarily usable exclusively by a customer of an insurance company. Rather, first mobile device 103 may be a user device configured for use by a variety of users. In one or more instances, the first mobile device 103 may be a computing device configured to collect sensor data (e.g., global positioning system (GPS) data, micro electro mechanical systems (MEMS) data, telematics data, angular velocity data, timestamps, or the like) and to generate/display graphical user interfaces (which may include, e.g., recommended repair facilities, emergency services, or the like) accordingly.

Claim processing system 104 may be a computing system configured or otherwise maintained by an enterprise organization (e.g., an insurance entity, or the like). For example, the claim processing system 104 may be one or more servers, server blades, or the like, configured to receive a claim (e.g., from first mobile device 103, second mobile device 105, or the like), and process the claim accordingly. In some instances, the claim processing system 104 may maintain records of received claims, and a processing status for each claim.

Second mobile device 105 may be a computing device (e.g., a smart phone, a tablet, on board vehicle screen, laptop, or the like) that may be used by, for example, a driver/customer of an enterprise organization such as an insurance company. In some instances, second mobile device 105 may be used by a passenger in a vehicle being driven by the user of first mobile device 103. It should be understood that second mobile device 105 is not necessarily usable exclusively by a customer of an insurance company. Rather, second mobile device 105 may be a user device configured for use by a variety of users. In one or more instances, the second mobile device 105 may be a computing device configured to collect sensor data (e.g., global positioning system (GPS) data, MEMS data, telematics data, angular velocity data, timestamps, or the like) and to generate/display graphical user interfaces (which may include, e.g., recommended repair facilities, emergency services, or the like) accordingly. Emergency/repair dispatch system 106 may be one or more desktop computers, laptop computers, mobile devices, tablets, smart phones, servers, server blades, or the like that may be used by an emergency (e.g., police, hospital, firemen, or the like) or repair (e.g., a garage, maintenance facility, dealership, or the like) dispatch service. In some instances, emergency/repair dispatch system 106 may be configured to dispatch one or more service vehicles to a location of a collision after receiving a notification from the collision analysis platform 102 indicating that a collision occurred. In one or more instances, the emergency/repair dispatch system 106 may be configured to generate/display graphical user interfaces (e.g., dispatch interfaces, or the like) accordingly. In some instances, emergency/repair dispatch system 106 may be separate dispatch systems (e.g., an emergency dispatch system and a repair dispatch system) that are maintained or otherwise operated by separate entities, and they are shown as a single system for illustrative purposes only.

Computing environment 100 also may include one or more networks, which may interconnect one or more of collision analysis platform 102, first mobile device 103, claim processing system 104, second mobile device 105, emergency/repair dispatch system 106, or the like. For example, computing environment 100 may include a network 101 (which may, e.g., interconnect collision analysis platform 102, first mobile device 103, claim processing system 104, second mobile device 105, emergency/repair dispatch system 106, or the like).

In one or more arrangements, collision analysis platform 102, first mobile device 103, claim processing system 104, second mobile device 105, emergency/repair dispatch system 106, and/or the other systems included in computing environment 100 may be a computing device capable of and configured for receiving a user interface, receiving input using the user interface, and communicating the received input to one or more other computing devices. For example, collision analysis platform 102, first mobile device 103, claim processing system 104, second mobile device 105, emergency/repair dispatch system 106, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of collision analysis platform 102, first mobile device 103, claim processing system 104, second mobile device 105, and emergency/repair dispatch system 106 may, in some instances, be special-purpose computing devices configured to perform specific functions.

Referring to FIG. 1B, collision analysis platform 102 may include one or more processors 111, memory 112, and communication interface 113. A data bus may interconnect processor 111, memory 112, and communication interface 113. Communication interface 113 may be a network interface configured to support communication between collision analysis platform 102 and one or more networks (e.g., network 101, or the like). Memory 112 may include one or more program modules having instructions that when executed by processor 111 cause collision analysis platform 102 to perform one or more functions described herein and/or one or more databases that may store and/or otherwise maintain information which may be used by such program modules and/or processor 111. In some instances, the one or more program modules and/or databases may be stored by and/or maintained in different memory units of collision analysis platform 102 and/or by different computing devices that may form and/or otherwise make up collision analysis platform 102. For example, memory 112 may have, store, and/or include collision analysis module 112a, collision analysis database 112b, and a machine learning engine 112c. Collision analysis module 112a may have instructions that direct and/or cause collision analysis platform 102 to execute advanced machine learning techniques for analyzing sensor data and generating/verifying collision outputs, as discussed in greater detail below. Collision analysis database 112b may store information used by collision analysis module 112a and/or collision analysis platform 102 in analyzing sensor data, generating/verifying collision outputs, and/or in performing other functions. Machine learning engine 112c may have instructions that direct and/or cause the collision analysis platform 102 to generate/verify collision outputs, and to set, define, and/or iteratively refine optimization rules and/or other parameters used by the collision analysis platform 102 and/or other systems in computing environment 100.

Figure 2B:
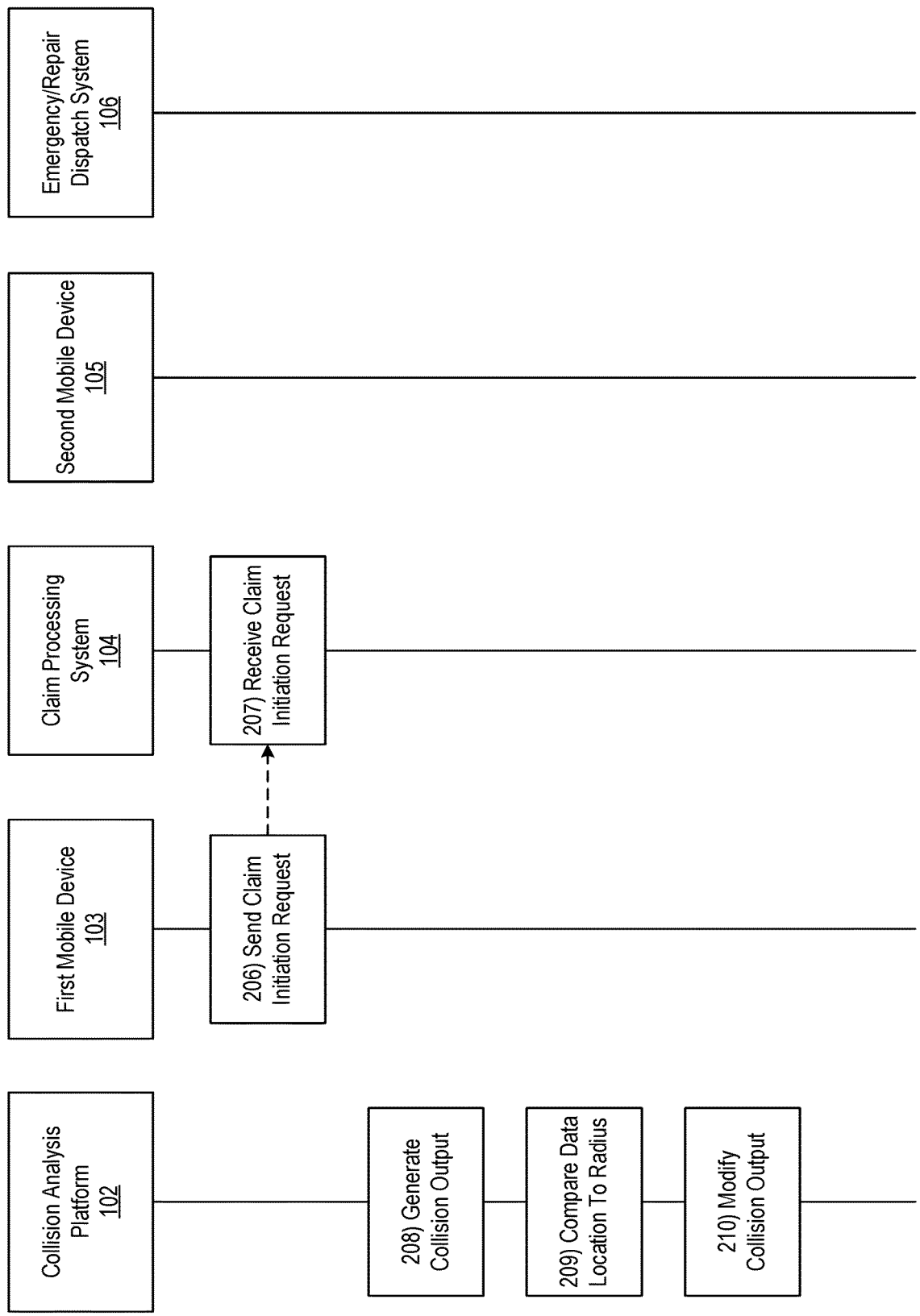

FIGS. 2A-2I depict an illustrative event sequence for implementing improved machine learning techniques to apply geospatial and telematics filters to reduce generation of false positive and false negative collision outputs in accordance with one or more example embodiments. Referring to FIG. 2A, at step 201, the first mobile device 103 and the second mobile device 105 may collect sensor data. For example, the first mobile device 103 and/or the second mobile device 105 may collect GPS data, telematics data (e.g., acceleration data, velocity data, braking data, driving signatures, or the like), angular velocity data, or the like corresponding to movement of the first mobile device 103 and/or the second mobile device 105. In some instances, one or more vehicle sensors may be further configured to collect sensor data along with the first mobile device 103 and/or the second mobile device 105. In these instances, the one or more vehicle sensors may provide the collected sensor data to the collision analysis platform 102 in a similar manner to that described with regard to first mobile device 103 and/or second mobile device 105.

At step 202, the first mobile device 103 and/or the second mobile device 105 may establish a connection with the collision analysis platform 102. For example, the first mobile device 103 and the second mobile device 105 may establish first and second wireless data connections to link the first mobile device 103 and the second mobile device 105 to the collision analysis platform 102 (e.g., in preparation for sending the sensor data collected at step 201). In some instances, the first mobile device 103 and/or the second mobile device 105 may identify whether or not a connection is already established with the collision analysis platform 102. If a connection is already established, the first mobile device 103 and/or the second mobile device 105 might not re-establish the connection. If a connection was not previously established, the first mobile device 103 and/or the second mobile device 105 may establish the first or second wireless data connection as described herein.

At step 203, the first mobile device 103 and/or the second mobile device 105 may send the sensor data collected at step 201 to the collision analysis platform 102. In some instances, the first mobile device 103 and/o the second mobile device 105 may send the sensor data while the first and second wireless data connections are established.

At step 204, the collision analysis platform 102 may receive the sensor data from the first mobile device 103 and/or the second mobile device 105. In some instances, the collision analysis platform 102 may receive the sensor data from the first mobile device 103 and/or the second mobile device 105 while the first and/or second wireless data connections are established and via the communication interface 113.

At step 205, first mobile device 103 may establish a connection with claim processing system 104. For example, the first mobile device 103 may establish a third wireless data connection with the claim processing system 104 to link the first mobile device 103 to the claim processing system 104 (e.g., in preparation for sending a request to initiate a claim). In some instances, the first mobile device 103 may identify whether or not a connection is already established with the claim processing system 104. If a connection is already established with the claim processing system 104, the first mobile device 103 might not re-establish the connection. If a connection is not yet established with the claim processing system 104, the first mobile device 103 may establish the third wireless data connection as described herein.

Referring to FIG. 2B, at step 206, the first mobile device 103 may send a request to initiate a claim (e.g., related to a vehicle collision, accident, or the like) to the claim processing system 104. In some instances, the first mobile device 103 may send the request to initiate the claim to the claim processing system 104 while the third wireless data connection is established. For example, the first mobile device 103 may display a graphical user interface similar to graphical user interface 405, which is shown in FIG. 4, which may allow a user to input details of a collision within a claim processing application, or the like.

At step 207, the claim processing system 104 may receive the request to initiate a claim from the first mobile device 103. In some instances, the claim processing system 104 may receive the request to initiate a claim while the third wireless data connection is established.

At step 208, the collision analysis platform 102 may apply one or machine learning algorithms to the sensor data received at step 204 to generate a collision output. For example, the collision analysis platform 102 may compare the sensor data received at step 204 to one or more thresholds created using labelled datasets corresponding to sensor data associated with collision events and non-collision events. Based on a holistic comparison of the sensor data received at step 204 to the machine learning datasets, the collision analysis platform 102 may generate a collision output indicating whether or not a collision is determined. For example, the collision analysis platform 102 may apply one or more of: artificial neural networks, decision trees, support vector machines, regression analysis, Bayesian networks, genetic algorithms, semi-supervised learning, feature learning, anomaly detection, or the like to calculate thresholds using the sensor data and the machine learning datasets generate the collision output.

In some instances, the collision analysis platform 102 may generate a collision output indicating that a collision occurred. In these instances, the collision analysis platform 102 may proceed to step 209 for verification (e.g., to analyze whether the collision output is a false positive). In other instances, the collision analysis platform 102 may generate a collision output indicating that a collision did not occur. In these instances, the collision analysis platform 102 may proceed to step 226 for verification (e.g., to analyze whether the collision output is a false negative).

At step 209, the collision analysis platform 102 may initiate application of a geo-spatial filter. For example, the collision analysis platform 102 may identify a GPS location corresponding to collection of the sensor data (e.g., a location of the alleged collision event). For example, the sensor data received at step 204 may include GPS data. The collision analysis platform 102 may utilize mapping data, location data, or the like to identify a false positive location (e.g., a ski resort, body of water, amusement park, or the like) that is closest in proximity to the location of the alleged collision event. For example, it may be typical for the first mobile device 103 to generate sensor data at these false positive locations that may resemble collision data (e.g., while engaging in skiing, riding roller coasters, boating, or the like). In some instances, the collision analysis platform 102 may compare a distance between the location of the alleged collision event and the false positive location to a predetermined radius distance (which may e.g., be computed by applying one or more machine learning algorithms). For example, the collision analysis platform 102 may analyze historical data to identify a radius within which a number of determined collision events are false positives.

In some instances, the collision analysis platform 102 may dynamically adjust this radius based on newly acquired data and results of collision output verification. For example, if more than a threshold number of true collisions occur within the radius and are being flagged as non-collision events (e.g., due to their proximity to the false positive location), the collision analysis platform 102 may decrease the radius, so as to dynamically improve the collision output verification. Similarly, if more than a threshold number of non-collision events occur outside the radius and are being flagged as collision events (e.g., not filtered out due to their proximity to the false positive location), the collision analysis platform 102 may increase the radius, so as to dynamically improve the collision output verification.

At step 210, the collision analysis platform 102 may affirm or modify the collision output, generated at step 208, based on the comparison of the distance between the alleged collision event and a false positive location to the predetermined radius. For example, if the collision analysis platform 102 determines, at step 209, that the distance between the alleged collision event and the false positive location exceeds the predetermined radius, the collision analysis platform 102 may affirm the collision output indicating that a collision occurred. If the collision analysis platform 102 determines, at step 209, that the distance between the alleged collision event and the false positive location does not exceed the predetermined radius, the collision analysis platform 102 may modify the collision output to indicate that a collision did not occur (e.g., correcting the false positive).

In some instances, if the collision analysis platform 102 corrects a false positive at step 210, the method may end, whereas if a collision output is affirmed, the collision analysis platform 102 may proceed to step 211 for further verification (e.g., to apply additional filters for false positive identification). In other instances, the collision analysis platform 102 may proceed to step 211 in either circumstance (e.g., to apply additional filters for false positive identification or to verify the correction made at step 210).

Referring to FIG. 2C, at step 211, the collision analysis platform 102 may initiate application of a telematics filter to the collision output. For example, the collision analysis platform 102 may analyze telematics data included in the sensor data received at step 204 using one or more machine learning algorithms to create the thresholds using the sensor data and to compare with the thresholds created using one or more machine learning datasets corresponding to historical data corresponding to roller coasters, skiing, boating, or the like and other machine learning datasets corresponding to vehicle collisions. In doing so, the collision analysis platform 102 may compute a first likelihood of collision score indicating a degree of similarity between the sensor data and the one or more machine learning datasets.

At step 212, the collision analysis platform 102 may compare the first likelihood of collision score to a first collision threshold (which may e.g., be determined and/or dynamically updated using machine learning). For example, the collision analysis platform 102 may determine that a number of first likelihood of collision scores are exceeding the first collision threshold (e.g., indicating a match between the sensor data and the collision datasets), but are actually associated with a non-collision rather than a collision event. In these instances, the collision analysis platform 102 may determine that the first collision threshold is too low and should be increased. Similarly, if all (or at least a predetermined number) of the likelihood of true collision scores do not exceed the first collision threshold but are actually associated with a true collision event rather than non collision event, the collision analysis platform 102 may determine that the first collision threshold is too high and should be reduced.

At step 213, the collision analysis platform 102 may affirm or correct the collision output based on the comparison at step 212. For example, if the collision analysis platform 102 determined that the first likelihood of collision score exceeds the first collision threshold, the collision analysis platform 102 may affirm the collision output to indicate that a collision occurred. In contrast, if the collision analysis platform 102 determined that the first likelihood of collision score did not exceed the first collision threshold, the collision analysis platform 102 may modify the collision output to indicate that a non-collision event occurred (e.g., correcting the false positive). For example, the collision analysis platform 102 may determine that the user merely was riding a roller coaster, skiing, boating, or the like and was not involved in collision.

In some instances, if the collision analysis platform 102 corrects a false positive at step 213, the method may end, whereas if a collision output is affirmed, the collision analysis platform 102 may proceed to step 214 for further verification (e.g., to apply additional filters for false positive identification). In other instances, the collision analysis platform 102 may proceed to step 214 in either circumstance (e.g., to apply additional filters for false positive identification or to verify the correction made at step 213). In yet other instances, the collision analysis platform 102 may proceed to step 226 in either circumstance (e.g., to apply additional filters for false negative identification or to verify the correction made at step 213).

At step 214, the collision analysis platform 102 may initiate application of an angular velocity filter to the collision output. For example, the collision analysis platform 102 may analyze angular velocity included in the sensor data received at step 204 using one or more machine learning algorithms to compute the thresholds using the sensor data. In doing so, the collision analysis platform 102 may compute a second likelihood of collision score indicating a degree of similarity between the sensor data and the one or more machine learning datasets.

Figure 2D:
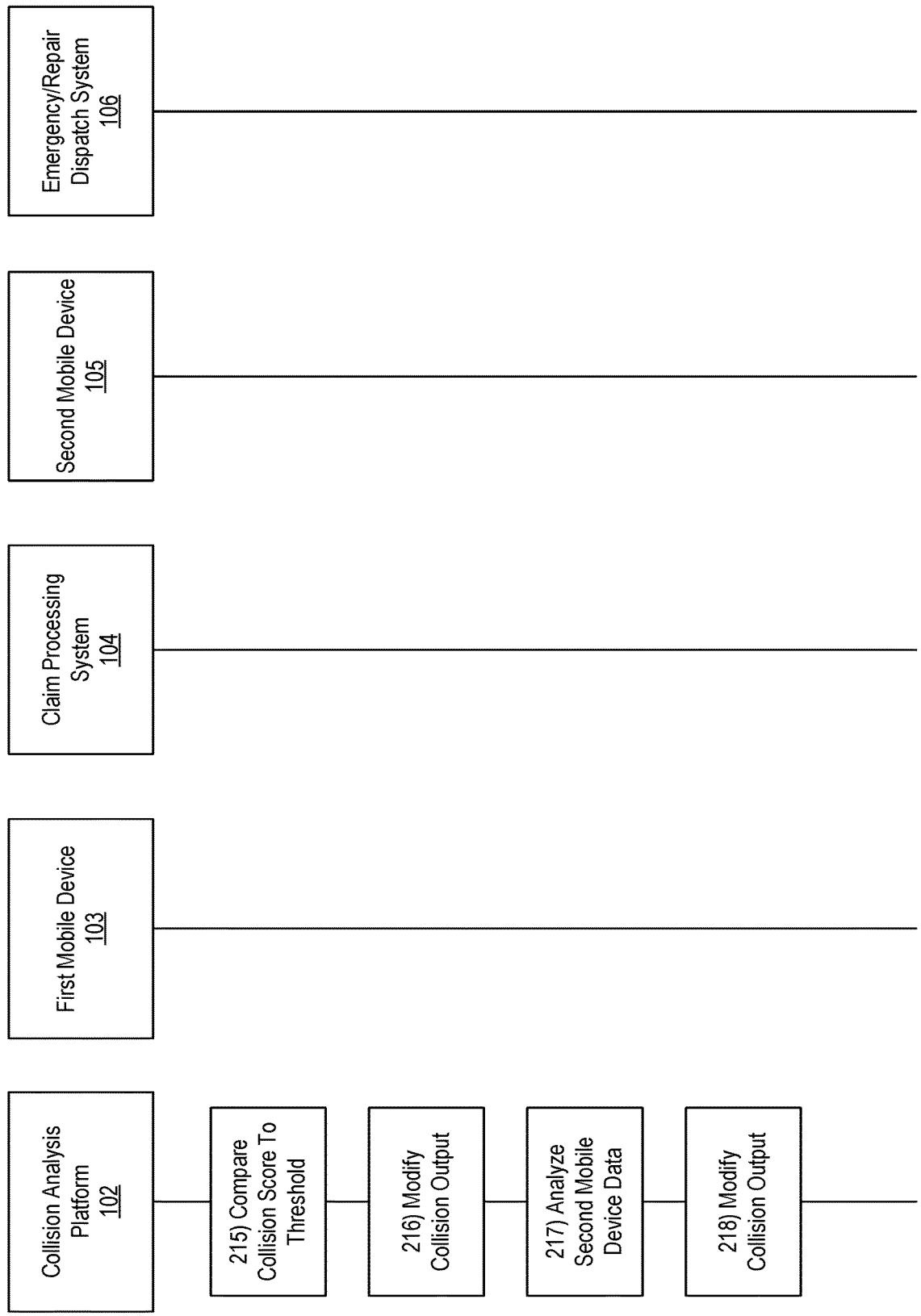

Referring to FIG. 2D, at step 215, the collision analysis platform 102 may compare the second likelihood of collision score to a second collision threshold (which may e.g., be determined and/or dynamically updated using machine learning to one or more machine learning datasets corresponding to historical data corresponding to roller coasters, skiing, boating, dropping a phone, or the like and other machine learning datasets corresponding to vehicle collisions). For example, the collision analysis platform 102 may determine that a number of second likelihood of collision scores are exceeding the second collision threshold (e.g., indicating a match between the sensor data and the collision datasets), but are actually associated with a non-collision rather than a collision event. In these instances, the collision analysis platform 102 may determine that the second collision threshold is too low and should be increased. Similarly, if all (or at least a predetermined number) of the likelihood of true collision scores do not exceed the second collision threshold, the collision analysis platform 102 may determine that the second collision threshold is too high and should be reduced.

At step 216, the collision analysis platform 102 may affirm or correct the collision output based on the comparison at step 213. For example, if the collision analysis platform 102 determined that the second likelihood of collision score exceeds the second collision threshold, the collision analysis platform 102 may affirm the collision output to indicate that a collision occurred. In contrast, if the collision analysis platform 102 determined that the second likelihood of collision score did not exceed the second collision threshold, the collision analysis platform 102 may modify the collision output to indicate that a non-collision event occurred (e.g., correcting the false positive). For example, the collision analysis platform 102 may determine that the user merely dropped his or her phone and phone and was not involved in a collision.

In some instances, if the collision analysis platform 102 corrects a false positive at step 216, the method may end, whereas if a collision output is affirmed, the collision analysis platform 102 may proceed to step 217 for further verification (e.g., to apply additional filters for false positive identification). In other instances, the collision analysis platform 102 may proceed to step 217 in either circumstance (e.g., to apply additional filters for false positive identification or to verify the correction made at step 216). In yet other instances, the collision analysis platform 102 may proceed to step 226 in either circumstance (e.g., to apply additional filters for false negative identification or to verify the correction made at step 216).

At step 217, the collision analysis platform 102 may initiate application of a secondary source filter to the collision analysis platform 102. For example, in some instances, the analysis described above at steps 208-216 may be performed by the collision analysis platform 102 using sensor data collected by the first mobile device 103, but not from the second mobile device 105. Accordingly, at step 217, the collision analysis platform 102 may apply one or more of the filters described above at steps 208-216 using sensor data from the second mobile device 105, one or more embedded vehicle sensors, or the like. In some instances, the collision analysis platform 102 may determine, using the sensor data from both the first mobile device 103 and the second mobile device 105, that the collision output should be modified (false positive identification). In other instances, the collision analysis platform 102 may determine, using the sensor data from both the first mobile device 103 and the second mobile device 105, that the collision output should be affirmed. In these instances, the collision analysis platform 102 may proceed to step 238. In yet other instances, the collision analysis platform 102 may reach different conclusions using the sensor data from the first mobile device 103 and the second mobile device 105.

At step 218, the collision analysis platform 102 may affirm or correct the collision output based on the analysis at step 217. For example, if the collision analysis platform 102 determined that the collision output should be affirmed using the sensor data from both the first mobile device 103 and the second mobile device 105, the collision analysis platform 102 may affirm the collision output to indicate that a collision occurred. In contrast, if the collision analysis platform 102 determined that the collision output should be modified using the sensor data from both the first mobile device 103 and the second mobile device 105, the collision analysis platform 102 may modify the collision output to indicate that a non-collision event occurred (e.g., correcting the false positive).

In some instances, if the collision analysis platform 102 corrects a false positive at step 218, the method may end, whereas if a collision output is affirmed, the collision analysis platform 102 may proceed to step 219 for further verification (e.g., to apply additional filters for false positive identification). In other instances, the collision analysis platform 102 may proceed to step 219 in either circumstance (e.g., to apply additional filters for false positive identification or to verify the correction made at step 218). In yet other instances, the collision analysis platform 102 may proceed to step 226 in either circumstance (e.g., to apply additional filters for false negative identification or to verify the correction made at step 218). In instances where the collision analysis platform 102 reached different conclusions based on the sensor data corresponding to the first mobile device 103 and the second mobile device 105, the collision analysis platform 102 may proceed to step 219 and/or 226 for further analysis.

Referring to FIG. 2E, at step 219, the collision analysis platform 102 may send one or more commands directing the first mobile device 103 to display a collision confirmation interface. In some instances, the collision analysis platform 102 may send the one or more commands directing the first mobile device 103 to display the collision confirmation interface via the communication interface 113 and while the first wireless data connection is established.

At step 220, the first mobile device 103 may receive the one or more commands directing the first mobile device 103 to display the collision confirmation interface. In some instances, the first mobile device 103 may receive the one or more commands directing the first mobile device 103 to display the collision confirmation interface while the first wireless data connection is established.

At step 221, based on the one or more commands directing the first mobile device 103 to display the collision confirmation interface, the first mobile device 103 may display the collision confirmation interface. In some instances, the first mobile device 103 may display a collision confirmation interface received from the collision analysis platform 102. In other instances, the first mobile device 103 may receive collision confirmation interface information from the collision analysis platform 102 and may generate the collision confirmation interface using the collision confirmation interface information.

In some instances, in generating and displaying the collision confirmation interface, the first mobile device 103 may display a graphical user interface similar to graphical user interface 505, which is shown in FIG. 5. For example, the first mobile device 103 may display an interface requesting user input confirming whether or not a collision occurred.

At step 222, the first mobile device 103 may receive a collision confirmation input indicating whether or not a collision occurred. For example, the first mobile device 103 may receive the collision confirmation input via a display of the first mobile device 103.

At step 223, the first mobile device 103 may send collision confirmation information to the collision analysis platform 102 indicating whether or not a collision occurred based on the collision confirmation input. In some instances, the first mobile device 103 may send the collision confirmation information to the collision analysis platform 102 while the first wireless data connection is established.

At step 224, the collision analysis platform 102 may receive the collision confirmation information sent at step 223. In some instances, the collision analysis platform 102 may receive the collision confirmation information via the communication interface 113 and while the first wireless data connection is established.

Figure 2F:
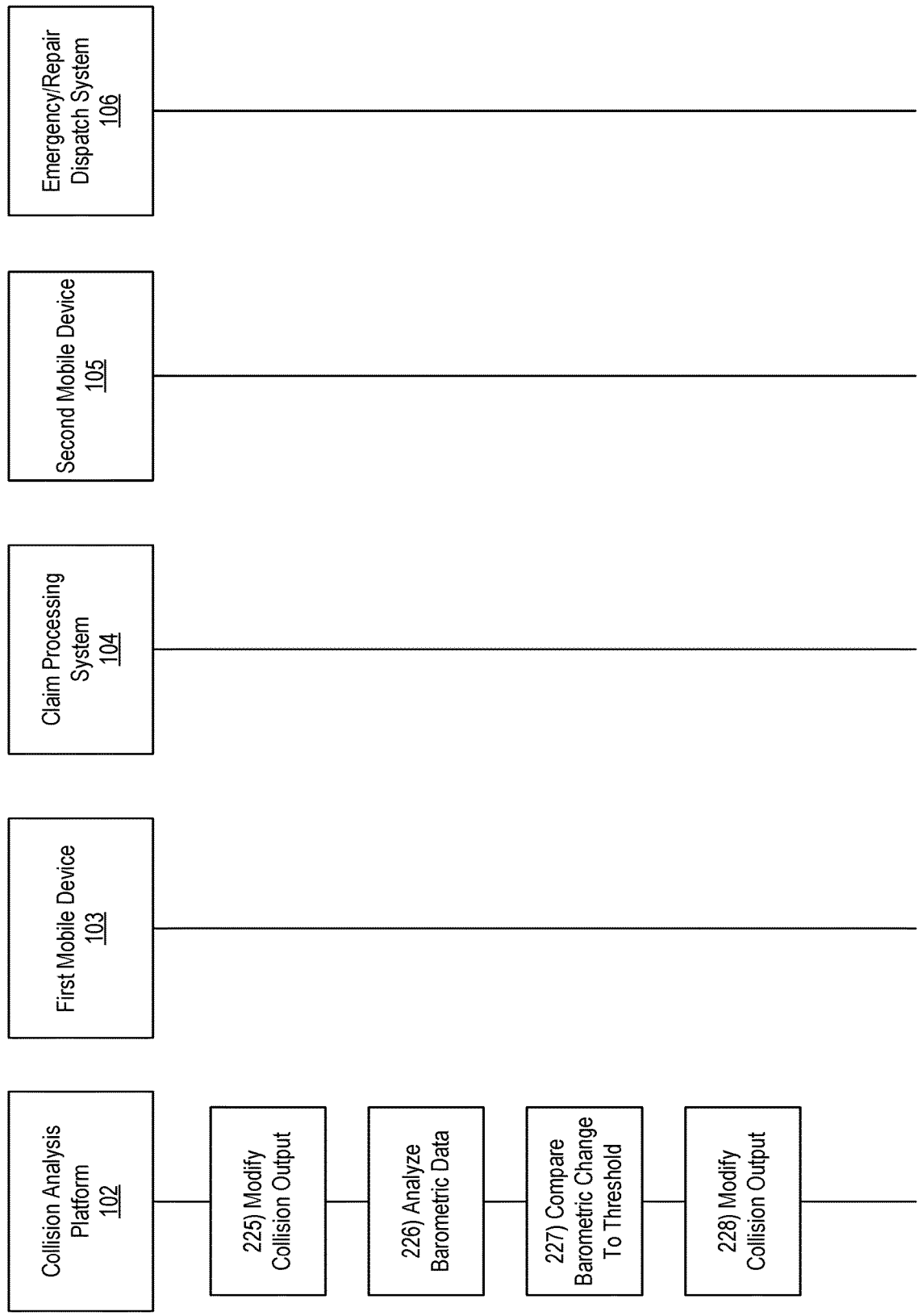

Referring to FIG. 2F, at step 225, the collision analysis platform 102 may affirm or correct the collision output based on the collision confirmation information received at step 224. For example, if the collision analysis platform 102 received collision confirmation information indicating that a collision did occur or if no information is received within a predetermined time frame, the collision analysis platform 102 may affirm the collision output to indicate that a collision occurred. In contrast, if the collision analysis platform 102 received collision confirmation information indicating that a collision did not occur, the collision analysis platform 102 may modify the collision output to indicate that a non-collision event occurred (e.g., correcting the false positive).

In some instances, if the collision analysis platform 102 corrects a false positive at step 225, the method may end. In instances where collision output is affirmed, the collision analysis platform 102 may proceed to step 238 to request assistance from emergency personnel, a repair service, or the like.

At step 226, the collision analysis platform 102 may initiate application of an airbag deployment filter to the collision output. For example, the collision analysis platform 102 may analyze barometric data included in the sensor data received at step 204 to compute the thresholds. In doing so, the collision analysis platform 102 may identify a barometric pressure value, change, or the like during the alleged collision event.

At step 227, the collision analysis platform 102 may compare the barometric pressure, pressure value, change, threshold, or the like to an airbag deployment threshold (which may e.g., be determined and/or dynamically updated using machine learning on datasets corresponding to airbag deployment data). For example, the collision analysis platform 102 may determine that over 50% (or other predetermined percentage) of airbag deployments are undetected. In these instances, the collision analysis platform 102 may determine that the airbag deployment threshold is too high and should be decreased. Similarly, if 50% (or other predetermined percentage) of the detected airbag deployments were false positives, the collision analysis platform 102 may determine that the airbag deployment threshold is too low and should be increased.

In instances where the collision analysis platform 102 determines that the airbag deployment threshold is exceeded, the collision analysis platform 102 may determine that airbags were deployed during the alleged collision event, and thus that a collision likely occurred. In contrast, where the collision analysis platform 102 determines that the airbag deployment threshold is not exceeded, the collision analysis platform 102 may determine that airbags were not deployed during the alleged collision event, and thus that a collision likely did not occur.

At step 228, the collision analysis platform 102 may affirm or correct the collision output based on the comparison at step 227. For example, if the collision analysis platform 102 determined that the barometric pressure exceeds the airbag deployment threshold, the collision analysis platform 102 may modify the collision output to indicate that a collision occurred (e.g., correcting the false negative). In contrast, if the collision analysis platform 102 determined that the barometric pressure did not exceed the airbag deployment, the collision analysis platform 102 may affirm the collision output indicating that a non-collision event occurred.

In some instances, if the collision analysis platform 102 corrects a false negative, at step 228, the collision analysis platform 102 may proceed to step 238, whereas if the collision output is not affirmed, the collision analysis platform may proceed to step 229 for further verification (e.g., to apply additional filters for false negative identification). In other instances, the collision analysis platform 102 may proceed to step 229 in either circumstance (e.g., to apply additional filters for false negative identification or to verify the correction made at step 228).

Figure 2G:
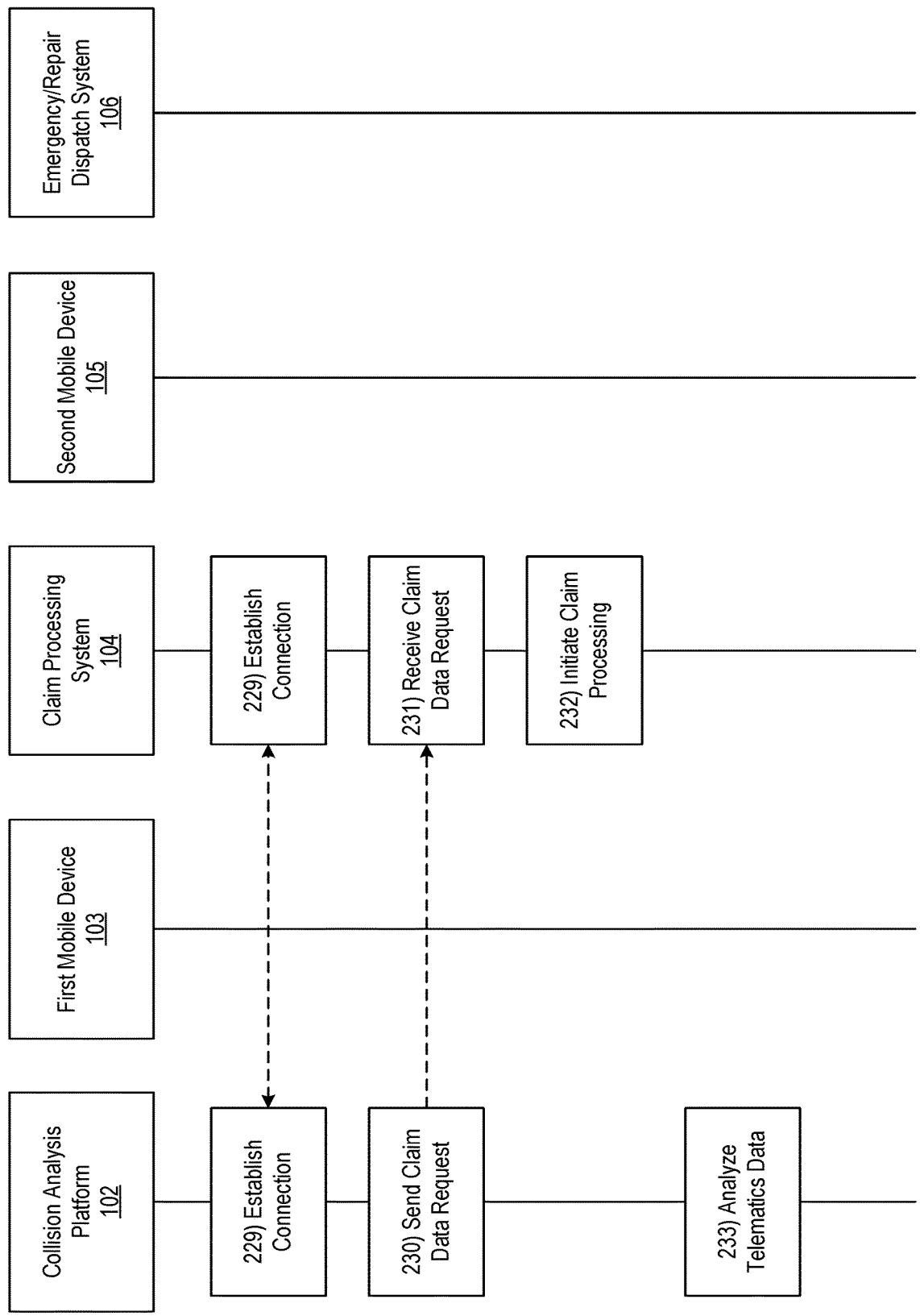

Referring to FIG. 2G, at step 229, the collision analysis platform 102 may establish a connection with claim processing system 104. For example, the collision analysis platform 102 may establish a fourth wireless data connection with the claim processing system 104 to link the collision analysis platform 102 to the claim processing system 104 (e.g., for the purpose of initiating claims processing). In some instances, the collision analysis platform 102 may determine whether or not a connection is already established with the claim processing system 104. If a connection is already established with the claim processing system 104, the collision analysis platform 102 might not re-establish the connection. If a connection is already established with the claim processing system 104, the collision analysis platform 102 may establish the fourth wireless data connection as described herein.

At step 230, the collision analysis platform 102 may send a collision output corresponding to the first mobile device 103 to claims processing system 104. In some instances, the collision analysis platform 102 may send the collision output corresponding to the first mobile device 103 to claims processing system for claim data via the communication interface and while the fourth wireless data connection is established.

At step 231, the claim processing system 104 may receive the collision output sent at step 230. In some instances, the claim processing system 104 may receive the collision output while the fourth wireless data connection is established.

At step 232, the claim processing system 104 may kickstart claims processing for the collision data corresponding to the first mobile device 103. For example, the claim processing system 104 may identify whether vehicle towing would be warranted based on the collision output submitted by the first mobile device 103 (e.g., the claim initiation request received at step 207) and a time of submission.

At step 233, the collision analysis platform 102 may analyze telematics data using machine learning techniques and create thresholds and these thresholds are compared to thresholds determined and/or dynamically updated using machine learning on datasets created by merging historical claims data with telematics data.

At step 234, the collision analysis platform 102 may affirm or correct the collision output based on the comparison at step 233. For example, if the collision analysis platform 102 determined that the thresholds exceed the thresholds created using claims data and telematics data, the collision analysis platform 102 may modify the collision output to indicate that a collision occurred (e.g., correcting the false negative). In contrast, if the collision analysis platform 102 determined that the thresholds did not exceed the thresholds created using claims data and telematics data, the collision analysis platform 102 may affirm the collision output indicating that a non-collision event occurred. In some instances, if the collision analysis platform 102 corrects a false negative, at step 228, the collision analysis platform 102 may proceed to step 238.

Figure 2H:
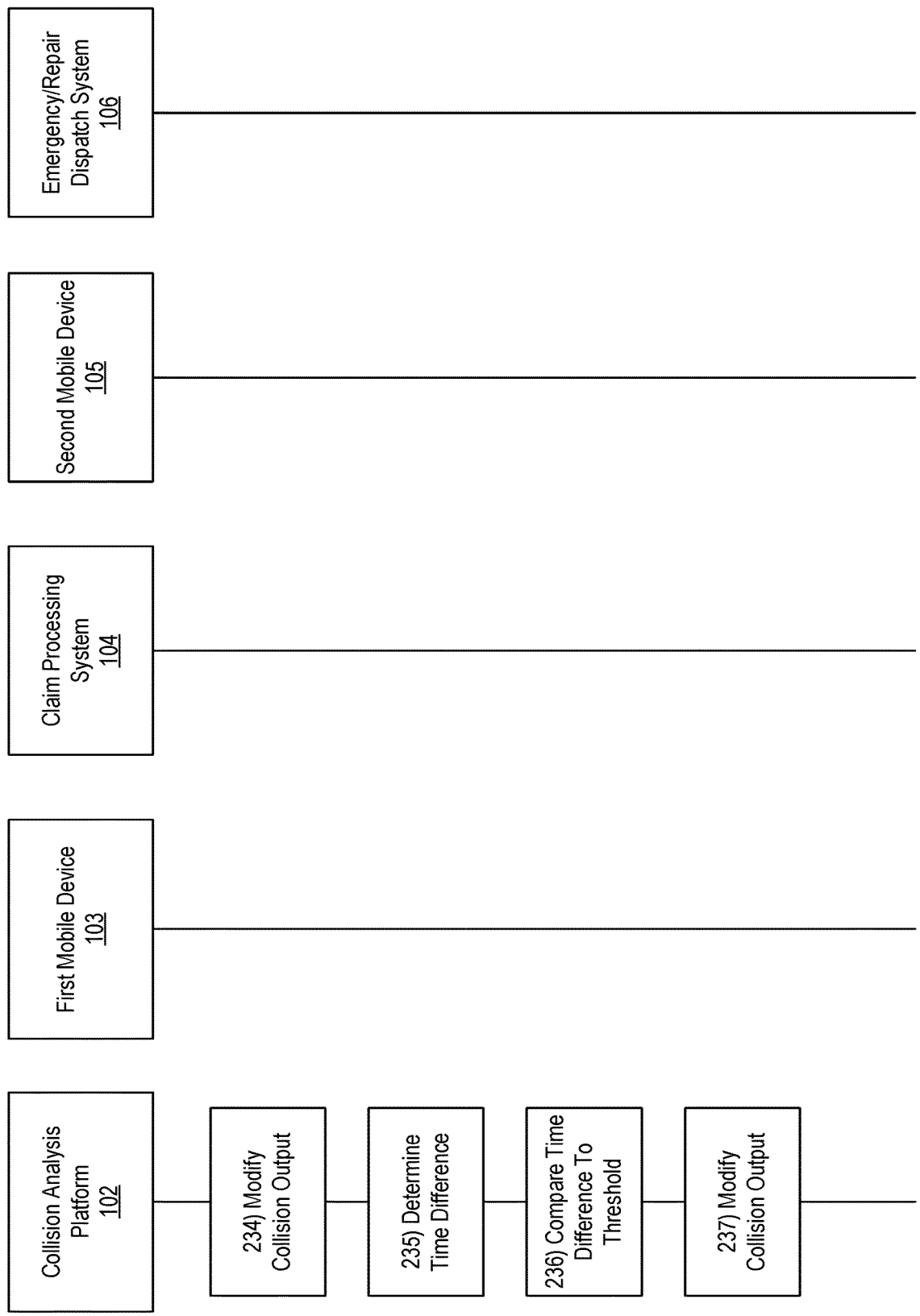

With reference to FIG. 2H, at step 235, collision analysis platform 102 may compute a time difference between the potential collision event and trip start time. At step 235, the collision analysis platform 102 may compare the time difference to a predetermined time difference threshold (which may e.g., be determined and/or dynamically updated using machine learning). For example, the collision analysis platform 102 may determine that over 50% (or other predetermined percentage) of the true collision with time differences below the predetermined time difference threshold. In these instances, the collision analysis platform 102 may determine that the predetermined time difference threshold is too high and should be decreased. Similarly, if 50% (or other predetermined percentage) of the false positives relating to actual collision events were associated with time differences that exceed the predetermined time difference threshold, the collision analysis platform 102 may determine that the predetermined time difference threshold is too low and should be increased.

At step 236, in instances where the collision analysis platform 102 determines that the predetermined time difference threshold is exceeded, the collision analysis platform 102 may determine that a collision did occur. In contrast, where the collision analysis platform 102 determines that the predetermined time difference threshold is not exceeded, the collision analysis platform 102 may determine that a collision likely did not occur.

At step 237, in some instances, if the collision analysis platform 102 determines that a collision occurred, the collision analysis platform 102 may proceed to step 238. In other instances, if the collision analysis platform 102 determines that a collision did not occur, the method may end. Additionally, or alternatively, in either scenario, the collision analysis platform 102 may apply additional filters (e.g., false positive and/or false negative filters described above that are not yet applied, and/or other similar filters) to the collision output for further verification.

At step 238, the collision analysis platform 102 may establish a connection with the emergency/repair dispatch system 106. In one or more instances, the collision analysis platform 102 may establish a fifth wireless data connection with the emergency/repair dispatch system 106 to link the collision analysis platform 102 to the emergency/repair dispatch system 106 (e.g., in preparation for sending a dispatch request). In some instances, the collision analysis platform 102 may determine whether or not a connection is already established with the emergency/repair dispatch system 106. If a connection is already established with the emergency/repair dispatch system 106, the collision analysis platform 102 might not re-establish the connection. If a connection was not previously established with the emergency/repair dispatch system 106, the collision analysis platform 102 may establish the fifth wireless data connection as described herein.

Figure 2I:
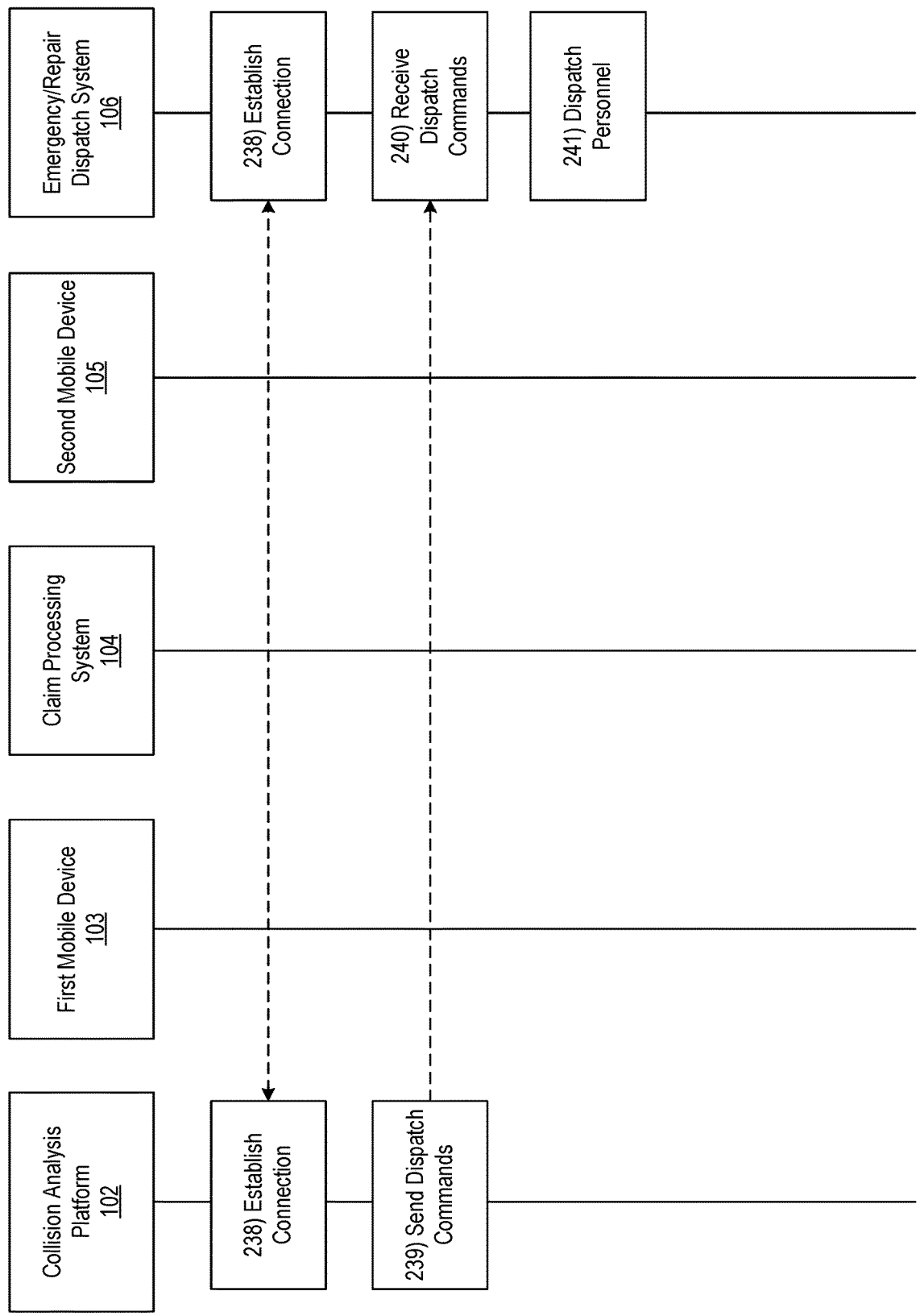

Referring to FIG. 2I, at step 239, the collision analysis platform 102 may send one or more commands directing the emergency/repair dispatch system 106 to generate and/or display a dispatch interface or to otherwise dispatch personnel, perform automated actions, or the like. In some instances, the collision analysis platform 102 may send the one or more commands directing the emergency/repair dispatch system 106 to generate and/or display the dispatch interface via the communication interface 113 and while the fifth wireless data connection is established.

At step 240, the emergency/repair dispatch system 106 may receive the one or more commands directing the emergency/repair dispatch system 106 to generate and/or display a dispatch interface or to otherwise dispatch personnel, perform automated actions, or the like. In some instances, the collision analysis platform 102 may receive the one or more commands directing the emergency/repair dispatch system 106 to generate/or display the interface while the fifth wireless data connection is established.

Figure 6:
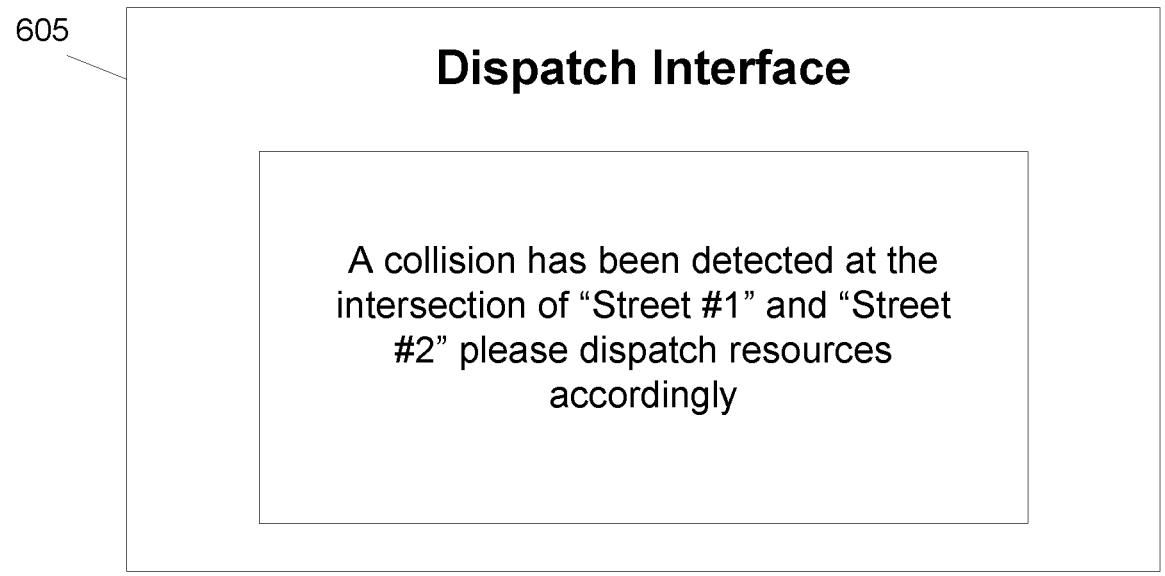

At step 241, the emergency/repair dispatch system 106 may display a graphical user interface dispatching personnel. In one or more instances, the emergency/repair dispatch system 106 may display the user interface based on the one or more commands directing the emergency/repair dispatch system 106 to generate and/or display a dispatch interface. In some instances, in displaying the graphical user interface, the emergency/repair dispatch system 106 may display a graphical user interface similar to graphical user interface 605, which is illustrated in FIG. 6. For example, the emergency/repair dispatch system 106 may display or otherwise cause display on another device of an interface indicating that a collision occurred and a location of the collision, and requesting that resources be dispatched to the location accordingly. Additionally or alternatively, the emergency/repair dispatch system 106 may perform other automated actions related to emergency/repair dispatch.

Accordingly, one or more aspects of the systems and methods described herein may be used to address technical difficulties associated with automated collision determinations. By applying false positive filters to collision outputs, a number of false positive collision determinations may be reduced. Similarly, by applying false negative filters to collision outputs, a number of false negative collision determinations may be reduced. Accordingly, by performing the one or more methods described herein, the one or more systems may improve data accuracy, reduce unwarranted dispatch of resources, and improve warranted dispatch of resources. Additionally, by increasing accuracy of automated collision determinations based on sensor data collected by a mobile device, the one or more systems and methods described herein may allow for increased reliance on mobile device data and may reduce reliance on integrated vehicle sensors that may be costly to purchase, install, maintain, and/or replace.

It should be understood that the steps described in the illustrative event sequence may be performed in any order without departing from the scope of the disclosure. For example, any of the false negative and/or false positive filters may be applied by the collision analysis platform 102 in any order, and the specified order is merely illustrative. In some instances, any of the false negative and/or false positive filters may be removed without exceeding the scope of this disclosure. Furthermore, upon detection of any false positives and/or false negatives, the collision analysis platform 102 may update one or more machine learning datasets and/or algorithms accordingly (e.g., datasets/algorithms applied in initial generation of the collision output and/or in application of the filters).

FIG. 3 depicts an illustrative method for implementing improved machine learning techniques to apply geospatial and telematics filters to reduce generation of false positive and false negative collision outputs in accordance with one or more example embodiments. Referring to FIG. 3, at step 305, a computing platform having at least one processor, a communication interface, and memory may receive mobile device data. At step 310, the computing platform may apply one or more crash detection algorithms. At step 315, the computing platform may determine whether or not a collision was detected. If a collision was detected, the computing platform may proceed to step 320. If a collision was not detected, the computing platform may proceed to step 335.

Referring to step 320, the computing platform may compare a distance between a false positive location and a data collection location to a predetermined radius distance. If the distance exceeds the predetermined radius, the computing platform may proceed to step 325. If the distance does not exceed the predetermined radius, the method may end.

At step 325, the computing platform may compute a telematics collision score and compare the telematics collision score to a predetermined telematics threshold. If the predetermined telematics threshold is exceeded, the computing platform may proceed to step 330. If the predetermined telematics threshold is not exceeded, the computing platform may proceed to step 335.

Referring to step 330, the computing platform may compute an angular velocity score and compare the angular velocity score to a predetermined angular velocity threshold. If the predetermined angular velocity threshold is exceeded, the computing platform may proceed to step 345. If the predetermined angular velocity threshold is not exceeded, the computing platform may proceed to step 335.

Returning to step 315, if a collision is not determined, the computing platform may determine whether an airbag was deployed based on barometer data. If an airbag was deployed, the computing platform may proceed to step 345. If an airbag was not deployed, the computing platform may proceed to step 340.

At step 340, the computing platform may compare the thresholds derived from telematic data against the thresholds from a dataset created using historical claims data and historical telematics data. If the threshold is exceeded, the computing platform may proceed to step 345. If the threshold is not exceeded, the method may end.

Referring to step 345, the computing platform may determine whether a user indicated that a collision did or did not occur. If the user indicated that a collision did not occur, the method may end. If the computing platform indicated that a collision did occur or if the user fails to respond within a predetermined time span, the computing platform may proceed to step 350. At step 350, the computing platform may send one or more commands directing a dispatch system to display a user interface or otherwise cause dispatch of one or more resources to a location of the collision.

As described above with regard to the illustrative event sequence, these filters are shown in FIG. 3 in an illustrative order that is not intended to limit the scope of their application. Rather, the filters may be applied in any order without exceeding the scope of the disclosure. Similarly, any filters may be added or removed without exceeding the scope of the disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:
      receive sensor data;
      generate, by applying one or more machine learning algorithms to the sensor data, a collision output indicating whether or not a collision occurred;
      in response to generating the collision output indicating that a collision occurred:
         identify a data collection location corresponding to the sensor data;
         determine whether or not the data collection location is within a predetermined radius of a false positive collection location;
         in response to determining that the data collection location is within the predetermined radius, modify the collision output to indicate that a collision did not occur;
         in response to determining that the data collection location is not within the predetermined radius;
         analyze telematics data included in the sensor data to compute a first likelihood of collision score;
         compare the first likelihood of collision score to a predetermined collision threshold;
         in response to determining that the first likelihood of collision score does not exceed the predetermined collision threshold, modify the collision output to indicate that a collision did not occur; and in response to determining that the first likelihood of collision score exceeds the predetermined collision threshold, affirm the collision output indicating that a collision did occur; and
      based on a determination that the collision output indicates that a collision did occur, send one or more commands to a dispatch computing system directing the dispatch computing system to dispatch a service vehicle to a location of the collision, wherein sending the one or more commands to the dispatch computing system directing the dispatch computing system to dispatch the service vehicle to the location of the collision causes the dispatch computing system to dispatch the service vehicle to the location of the collision.

2. The computing platform of claim 1, wherein the memory stores additional computer-readable instructions that, when executed by the at least one processor, cause the computing platform to:
   analyze angular velocity data included in the sensor data to compute a second likelihood of collision score;
   compare the second likelihood of collision score to the predetermined collision threshold;
   in response to determining that the second likelihood of collision score does not exceed the predetermined collision threshold, modify the collision output to indicate that a collision did not occur; and
   in response to determining that the second likelihood of collision score exceeds the predetermined collision threshold, affirm the collision output indicating that a collision did occur.

3. The computing platform of claim 2, wherein analyzing the angular velocity data comprises comparing the angular velocity data to one or more machine learning datasets corresponding to non-collision events in which a mobile device was dropped.

4. The computing platform of claim 1, wherein:
   the computing platform comprises one or more of: a mobile device that collected the sensor data or a computing system integrated into a vehicle corresponding to the collision output; and
   the sensor data is received from one or more of: a mobile device or vehicle based sensors.

5. The computing platform of claim 1, wherein the memory stores additional computer-readable instructions that, when executed by the at least one processor, cause the computing platform to:
   analyze one or more of: a data collection location, telematics data, or angular velocity corresponding to a second mobile device to generate a second collision output, wherein the sensor data is provided to the computing platform, at least in part, by the second mobile device;
determine whether the second collision output indicates that a collision did occur;
in response to determining that the second collision output indicates that a collision did not occur, modify the collision output to indicate that a collision did not occur; and
in response to determining that the second collision output indicates that a collision did occur, affirm the collision output indicating that a collision did occur.

6. The computing platform of claim 1, wherein the memory stores additional computer-readable instructions that, when executed by the at least one processor, cause the computing platform to:
send a corroboration request to a mobile device corresponding to the sensor data;
receive, from the mobile device, crash confirmation information indicating whether or not a collision occurred, wherein the crash confirmation information is based on user input received the mobile device indicating whether or not the collision occurred;
in response to determining that the crash confirmation information indicates that the collision did not occur, modify the collision output to indicate that a collision did not occur; and
in response to determining that the crash confirmation information indicates that the collision did occur, affirm the collision output indicating that a collision did occur.

7. The computing platform of claim 1, wherein the memory stores additional computer-readable instructions that, when executed by the at least one processor, cause the computing platform to:
in response to not generating a collision output indicating that a collision did not occur:
compare barometric data included in the sensor data to a predetermined airbag deployment threshold; and
in response to determining that the barometric data exceeds the predetermined airbag deployment threshold, modifying the collision output to indicate that a collision did occur.

8. The computing platform of claim 1, wherein the memory stores additional computer-readable instructions that, when executed by the at least one processor, cause the computing platform to:
in response to not generating a collision output indicating that a collision did not occur:
compare one or more thresholds determined using the telematics data with the predetermined collision threshold, wherein the predetermined collision threshold is derived, using Machine Learning, from the dataset formed by merging historical telematics data and historical claims data;
in response to determining that the one or more thresholds are greater than the predetermined collision threshold, modify the collision output to indicate that a collision occurred; and
in response to determining that the one or more thresholds are lower than the predetermined collision threshold, affirm the collision output indicating that a collision did not occur.

9. The computing platform of claim 1, wherein the false positive collection location comprises one or more of: a ski resort, an amusement park, or a body of water.

10. The computing platform of claim 1, wherein analyzing the telematics data included to compute the first likelihood of collision score comprises comparing the telematics data to one or more machine learning datasets corresponding to a roller coast event, a ski event, or a boat event.

11. The computing platform of claim 1, wherein the memory stores additional computer-readable instructions that, when executed by the at least one processor, cause the computing platform to:
update, after modifying the collision output, the one or more machine learning algorithms to indicate that a false positive collision determination was made by the one or more machine learning algorithms.

12. A method comprising:
at a computing platform comprising at least one processor, a communication interface, and memory:
receiving sensor data;
generating, by applying one or more machine learning algorithms to the sensor data, a collision output indicating whether or not a collision occurred;
in response to generating the collision output indicating that a collision occurred:
analyzing telematics data included in the sensor data to compute a first likelihood of collision score;
comparing the first likelihood of collision score to a predetermined collision threshold;
in response to determining that the first likelihood of collision score does not exceed the predetermined collision threshold, modifying the collision output to indicate that a collision did not occur, and
in response to determining that the first likelihood of collision score exceeds the predetermined collision threshold:
identifying a data collection location corresponding to the sensor data,
determining whether or not the data collection location is within a predetermined radius of a false positive collection location,
in response to determining that the data collection location is within the predetermined radius, modifying the collision output to indicate that a collision did not occur, and
in response to determining that the data collection location is not within the predetermined radius, affirming the collision output indicating that a collision did occur; and
based on a determination that the collision output indicates that a collision did occur, sending one or more commands to a dispatch computing system directing the dispatch computing system to dispatch a service vehicle to a location of the collision, wherein sending the one or more commands to the dispatch computing system directing the dispatch computing system to dispatch the service vehicle to the location of the collision causes the dispatch computing system to dispatch the service vehicle to the location of the collision.

13. The method of claim 12, further comprising:
analyzing angular velocity data included in the sensor data to compute a second likelihood of collision score;
comparing the second likelihood of collision score to the predetermined collision threshold;
in response to determining that the second likelihood of collision score does not exceed the predetermined collision threshold, modifying the collision output to indicate that a collision did not occur; and in response to determining that the second likelihood of collision score exceeds the predetermined collision threshold, affirming the collision output indicating that a collision did occur.

14. The method of claim 13, wherein analyzing the angular velocity data comprises comparing the angular velocity data to one or more machine learning datasets corresponding to non-collision events in which a mobile device was dropped.

15. The method of claim 12, wherein:
the computing platform comprises one or more of: a mobile device that collected the sensor data or a computing system integrated into a vehicle corresponding to the collision output; and
the sensor data is received from one or more of: a mobile device or vehicle based sensors.

16. The method of claim 15, further comprising:
analyzing one or more of: a data collection location, telematics data, or angular velocity corresponding to a second mobile device to generate a second collision output, wherein the sensor data is provided to the computing platform, at least in part, by the second mobile device;
determining whether the second collision output indicates that a collision did occur;
in response to determining that the second collision output indicates that a collision did not occur, modifying the collision output to indicate that a collision did not occur; and
in response to determining that the second collision output indicates that a collision did occur, affirming the collision output indicating that a collision did occur.

17. The method of claim 12, further comprising:
sending a corroboration request to a mobile device;
receiving, from the mobile device, crash confirmation information indicating whether or not a collision occurred, wherein the crash confirmation information is based on user input received the mobile device indicating whether or not the collision occurred;
in response to determining that the crash confirmation information indicates that the collision did not occur, modifying the collision output to indicate that a collision did not occur; and
in response to determining that the crash confirmation information indicates that the collision did occur, affirming the collision output indicating that a collision did occur.

18. The method of claim 12, further comprising:
in response to not generating a collision output indicating that a collision did not occur:
comparing barometric data included in the sensor data to a predetermined airbag deployment threshold; and
in response to determining that the barometric data exceeds the predetermined airbag deployment threshold, modifying the collision output to indicate that a collision did occur.

19. The method of claim 13, further comprising:
in response to not generating a collision output indicating that a collision did not occur:
comparing one or more thresholds determined using the telematics data with the predetermined collision threshold, wherein the predetermined collision threshold is derived, using Machine Learning, from the dataset formed by merging historical telematics data and historical claims data;
in response to determining that the one or more thresholds are greater than the predetermined collision threshold, modify the collision output to indicate that a collision occurred; and
in response to determining that the one or more thresholds are lower than the predetermined collision threshold, affirm the collision output indicating that a collision did not occur.

20. One or more non-transitory computer-readable media storing instructions that, when executed by a computing platform comprising at least one processor, a communication interface, and memory, cause the computing platform to:
receive sensor data;
generate, by applying one or more machine learning algorithms to the sensor data, a collision output indicating whether or not a collision occurred;
in response to generating the collision output indicating that a collision occurred, applying one or more of: a geo-location filter or a telematics filter to the collision output,
wherein applying the geo-location filter comprises:
identifying a data collection location corresponding to the sensor data,
determining whether or not the data collection location is within a predetermined radius of a false positive collection location,
in response to determining that the data collection location is within the predetermined radius, modifying the collision output to indicate that a collision did not occur, and applying a telematics filter, wherein applying the telematics filter comprises:
analyzing telematics data included in the sensor data to compute a first likelihood of collision score,
comparing the first likelihood of collision score to a predetermined collision threshold,
in response to determining that the first likelihood of collision score does not exceed the predetermined collision threshold, modifying the collision output to indicate that a collision did not occur, and
in response to determining that the first likelihood of collision score exceeds the predetermined collision threshold, affirming the collision output indicating that a collision did occur; and
based on a determination that the collision output indicates that a collision did occur, send one or more commands to a dispatch computing system directing the dispatch computing system to dispatch a service vehicle to a location of the collision, wherein sending the one or more commands to the dispatch computing system directing the dispatch computing system to dispatch the service vehicle to the location of the collision causes the dispatch computing system to dispatch the service vehicle to the location of the collision.

* * * * *